United States Patent [19]

Lavalette

[11] Patent Number: 5,134,221
[45] Date of Patent: Jul. 28, 1992

[54] ADHESIVE COMPOSITIONS

[75] Inventor: Annette Lavalette, Richmond, Great Britain

[73] Assignee: EMS-Inventa AG, Domat/Ems, Switzerland

[21] Appl. No.: 781,497

[22] Filed: Oct. 22, 1991

Related U.S. Application Data

[63] Continuation of Ser. No. 270,265, Nov. 14, 1988, abandoned.

[30] Foreign Application Priority Data

Nov. 12, 1976 [DE] Fed. Rep. of Germany ....... 3738495

[51] Int. Cl.⁵ .............................................. C08G 63/20
[52] U.S. Cl. .................................. 528/272; 528/275; 528/302; 528/305; 528/308; 528/308.3; 528/308.6; 525/419; 525/425; 525/431; 524/81; 524/700

[58] Field of Search ............... 528/272, 275, 302, 305, 528/308, 308.3, 308.6; 525/419, 425, 431; 524/81, 700

[56] References Cited

U.S. PATENT DOCUMENTS 4,094,721  6/1978  Sturm et al. ........................ 156/309
4,588,785  5/1986  Bax et al. ............................. 525/419

*Primary Examiner*—Morton Foelak
*Assistant Examiner*—Sam A. Acquah
*Attorney, Agent, or Firm*—Bierman and Muserlian

[57] ABSTRACT

Linear saturated copolyesters of terephthalic acid, isophthalic acid, butanediol, and one or more aliphatic diols having at least 13 carbon atoms used as adhesives for the formation of wash-resistant bonds especially for temperature-sensitive materials. Preferably, the melting points of these adhesive compositions are from 50° to 170° C. and their relative viscosities, measured as 1% solutions in meta-cresol at 20° C., are 1.40 to 1.80.

4 Claims, No Drawings

ADHESIVE COMPOSITIONS

PRIOR APPLICATION

This Application is a continuation of copending U.S. application Ser. No. 270,265, filed Nov. 14, 1988, now abandoned.

This application claims the priority of German Application P 37 38 495.3, filed Nov. 12, 1987.

The present invention is directed to improved adhesive compositions, particularly those capable of providing bonds which are resistant to washing.

BACKGROUND OF THE INVENTION

Copolyesters derived from terephthalic acid and isophthalic acid with aliphatic diols having 2 to 12 carbon atoms are known as melt adhesives. In such compositions, it is also known to include aliphatic dicarboxylic acids. It has been found most desirable that, for such compositions, the melting point of the copolyester be between about 80° and 150° C. Such melt adhesive compositions are described in EP-A-78889, DE-A-1920432, DE-A-2937946, U.S. Pat. No. 3,699,921, U.S. Pat. No. 4,094,721, and WO-A-83/2621.

For example, U.S. Pat. No. 4,496,713 teaches copolyesters of terephthalic acid, butanediol, and other aliphatic diols having 6 to 20 carbon atoms. Such compositions are useful for injection molding or extrusion. However, the elevated melting points of these materials render them undesirable for use in connection with temperature sensitive substrates such as textiles.

In U.S. Pat. No. 4,094,721, there are taught copolyesters of terephthalic acid, isophthalic acid, butanediol, and hexane diol. Optionally, one or more saturated dicarboxylic acids having 4 to 34 carbon atoms may also be included. These materials, however, have a substantial tendency to agglomerate, especially on milling and storage (see U.S. Pat. No. 4,217,426). In addition, these compositions do not stand up to repeated washings at normal washing temperatures.

It is also known to prepare copolyesters from terephthalic acid, adipic acid, ethylene glycol, and butanediol (see DE-A-1920432). However, the materials described in the foregoing reference have softening points in excess of 130° C., at which temperature things as temperature sensitive fabrics cannot readily withstand. If the composition is selected so that the softening point is below 130° C., it is too sticky to be useful in preparation of powdered coating materials as described in U.S. Pat. No. 4,094,721.

Japanese 58-134 114 describes polyester hot-melt adhesives which are derived from terephthalic acid, isophthalic acid, butanediol, and an additional diol. The diols set forth have a maximum of 5 carbon atoms. There is no suggestion that a different carbon atom range would produce any improved results.

Copolyesters based on terephthalic acid, adipic acid, ethylene glycol, and butanediol are also disclosed in U.S. Pat. No. 3,669,921. The agglomeration tendency of such compositions is so great that it is necessary to introduce substantial amounts of highly dispersed silicon dioxide in order to permit the granulate to be milled. Moreover, silicon dioxide must also be added to obtain a powder which would be suitable for coating, as described in WO-A-83/2621.

The latter patent teaches the combination of terephthalic acid, butanediol, diethylene glycol, and at least one saturated dicarboxylic acid having 3 to 12 carbon atoms. However, it has been found that the resistance to washing of such compositions is unacceptable.

EP-A-78889 describes the combination of terephthalic acid, isophthalic acid, butanediol, an inorganic powder, and aliphatic diols having 5 to 12 carbon atoms. While these compositions do not exhibit the tendency to agglomerate or to have poor storage stability, nonetheless, they are not really satisfactory for the purposes of the present invention. More specifically, their resistance to washing and dry cleaning is extremely poor and tends to the formation of undesirable bubbles.

In summary, prior art compositions of this nature suffer from important drawbacks. These include tendency to agglomerate, difficulty in milling, and lack of resistance to repeated washings. The last generally manifests itself in the formation of bubbles which not only detracts from the smooth feel of the fabric, but also weakens the bond itself.

SUMMARY OF THE INVENTION

Therefore, it is among the objects of the present invention to provide adhesive compositions which do not tend to agglomerate. It is also among the objects of the present invention to provide adhesive compositions which can withstand numerous washings at high temperatures. It is further among the objects of the present invention to provide compositions of the foregoing type which are non-sticky when in powder form.

The present invention comprises a careful tailoring of the monomers forming the copolyester adhesive composition so that all of the defects of the prior art are overcome. More specifically, such copolyesters are derived from a combination of terephthalic acid, isophthalic acid, butanediol, and higher aliphatic diols. The higher diols have at least 13 carbon atoms and are present in the amount of 1 to 30 mol %, based on the mixture of diols.

It has been found that, by observing the foregoing parameters, compositions are produced which have excellent initial separation strengths, high washing resistance, excellent dry cleaning resistance, and exhibit little or no bubble formation.

Moreover, such materials have markedly higher crystallization tendencies, probably due to the higher diols of which it is composed. This results in substantially reduced tendency to cohere compared with previously known compositions. These characteristics are particularly found when the higher diols have 13 to 20 carbon atoms.

The result is a low softening temperature coupled with the absence of agglomeration, even without the introduction of any additives. These materials can be processed without difficulty to produce a storage stable, aggregate-free powder.

DETAILED DESCRIPTION OF THE INVENTION

The copolyester adhesives of the present invention are produced in a manner analogous to the production of polybutylene-terephthalate as described in Kunststoffhandbuch, Volume 8, C. Hanser Verlag, Munich, 1973, Page 697. Of course, there are other ways of preparing these compositions which are well known to those of ordinary skill in the art.

In a preferred form of the invention, the molar ratio of terephthalic acid to isophthalic acid is maintained between 75:25 and 40:60. More preferably, this ratio is from 65:35 to 45:55. The molar ratio of butanediol to the higher aliphatic diol (or mixture thereof) is 99:1 to 70:30. In a particularly preferred form of the invention, this ratio is 95:5 to 80:20.

The higher diols contain 13 to 20, preferably 14 to 18, carbon atoms. They are advantageously used in an amount of 1 to 30 mol %, preferably 5 to 20 mol %.

It has been found that commercial mixtures of diols can be used in the present invention. For example, SR 100 diol has been found quite suitable. This is an aliphatic mixture of diols having 13 to 18 carbon atoms. The average chain length is 14 carbon atoms and the product is available from ARCO, Sartomer AG, Marshall Building, Westtown Road, West Chester, Pa. 19380, U.S.A.

It has also been found desirable that the compositions of the present invention have relative viscosities of 1.40 to 1.80. Preferably, the viscosity should be between 1.50 and 1.70. These viscosities are measured as a 1% m-cresol solution at 20° C. The melting points of the compositions are preferably 90° to 170° C., more preferably 100° to 130° C. Of course, the usual additives may also be included in the present compositions; e.g. processing agents, stabilizers, plasticizers, fillers, pigments, optical brighteners, etc. The compositions are pulverized in accordance with known methods. In particular, cold milling has been found suitable.

The following examples are intended to illustrate the present invention, but are not limitative.

EXAMPLES 1 to 3

Terephthalic acid and isophthalic acid are esterified with butanediol and SR 100 diol, in accordance with the molar ratios given in Table 1, in the presence of titanium tetrabutylate. The reaction takes place at 200° C. to 230° C., under nitrogen gas in an autoclave with stirring until the theoretical amount of water has been split off. The pressure is then reduced during an additional hour to about 1 mbar, followed by polycondensation at 250° C., until the desired viscosity is reached. The autoclave contents are then removed through the bottom valve, cooled, and granulated. The dried granulate is cold milled under nitrogen, and the granular fraction, between 80 to 200 μm, is sieved off.

COMPARATIVE EXAMPLES

Comparative Examples A, B, C, D, E and F are prepared from compositions according to Table 1, in the same manner as Examples 1 to 3. The results are given in Table 2. The parameters for all the Examples are determined as follows:

$\eta$ rel: the relative viscosity is determined as a 1% solution in m-cresol at 20° C.

Tm: melting point is the maximum of the melt peak obtained by differential scanning calorimetry at a heating rate of 20° C./min.

Processability: the powder was judged for processability on a scale of 1 (good), 2 (satisfactory) and 3 (poor).

Separation strength/Bubble formation: powder having a particle size of 80 to 200 μm is coated on a conventional carrier material using a powder point coating apparatus having a 17 mesh gravure roller at a coating weight of 17±2 g/m$^2$. This is then adhered to a conventional upper material using a continuous press at 130° C. under a pressure of 350 g/cm$^2$. At the adhered parts, the bonding is measured initially, after 10 washes at 60° C., after 10 washes at 95° C., and after 10 dry cleanings. The separation strength is calculated according to DIN 54310. After 10 washes, the tests are evaluated on a scale of 1 to 5 on the upper material for bubble formation according to the following scale:

1. Very good, no bubbles
2. Good, very few, barely visible bubbles
3. Few, but clearly visible small bubbles (<2 mm)
4. Many small and large bubbles
5. Very large long bubbles.

TABLE 1

| Example | Composition (Mol %) | | | | | | | Additive (wt. %) |
| | TPA | IPA | ADA | BD | HD | DDD | SR100 | |
| --- | --- | --- | --- | --- | --- | --- | --- | --- |
| 1 | 50 | 50 | — | 90 | — | — | 10 | — |
| 2 | 50 | 50 | — | 80 | — | — | 20 | — |
| 3 | 62 | 38 | — | 70 | — | — | 30 | — |
| A | 75 | 25 | — | 45 | 55 | — | — | 0.15 talc |
| B | 85 | 15 | — | 60 | — | 40 | — | 0.15 talc |
| C | 70 | 30 | — | 50 | 50 | — | — | — |
| D | 50 | 50 | — | 100 | — | — | — | — |
| E | 60 | — | 40 | 75 | — | 25 | — | — |
| F | 85 | 15 | — | 50 | 50 | — | — | — |

TPA = terephthalic acid
IPA = isophthalic acid
ADA = adipic acid
BD = butanediol
HD = hexanediol
DDD = dodecanediol

TABLE 2

| Example | 1 | 2 | 3 | A | B | C | D | E | F |
| --- | --- | --- | --- | --- | --- | --- | --- | --- | --- |
| Tm (°C.) | 120 | 98 | 122 | 120 | 100 | 110 | 125 | 112 | 110 |
| $\eta$ rel | 1.55 | 1.63 | 1.64 | 1.67 | 1.64 | 1.58 | 1.67 | 1.61 | 1.62 |
| Processability of powder | 1 | 1 | 1 | 1 | 1 | 3 | 2 | 1 | 2 |
| Separation strength (N/5 cm) | | | | | | | | | |
| Without treatment | 13 | 14 | 13 | 12 | 11 | 8 | 10 | 10 | 10 |
| after 10 × 60° C. washes | 11.5 | 13 | 11 | 8 | 9 | 5 | 4 | 7 | 9 |
| after 10 × 95° C. washes | 9 | 10 | 9 | 6 | 4 | 3 | 0 | 6 | 7 |
| after 10 × dry clean. | 10 | 12 | 10 | 8 | 6 | 5 | 2 | 7 | 6 |
| Bubble formation | | | | | | | | | |

TABLE 2-continued

| Example | 1 | 2 | 3 | A | B | C | D | E | F |
|---|---|---|---|---|---|---|---|---|---|
| after 10 × 60° C. washes | 1 | 1 | 1 | 3 | 3 | 4 | 3 | 2 | 2 |
| after 10 × 95° C. washes | 2 | 2 | 2 | 4 | 5 | 4 | — | 3 | 3 |

Adhesive compositions which exhibit bubble formation values of 3 to 5 are not acceptable adhesives. In general, the compositions of Examples 1 to 3 (the present invention) have surprising superior properties to those of the five Comparative Examples.

As is apparent from the foregoing, the present invention is to be broadly construed and not to be limited except by the character of the claims appended hereto.

I claim:

1. An adhesive composition for textiles consisting essentially of an adhesively effective amount of a linear saturated copolyester consisting essentially of a mixture of terephthalic acid and isophthalic acid in a mol ratio of 75:25 to 40:60 esterified with a mixture of butanediol and 1 to 30 mol %, based on the total amount of diols, of at least one higher diol of 14 to 18 carbon atoms, said polyester having a melting point of 90° to 170° C. and at least one additive taken from the class consisting of stabilizers, plasticizers, pigments, optical brighteners, and fillers.

2. The composition of claim 1 wherein the copolyester has a relative viscosity, measured as a 1% solution in m-cresol at 26° C., of 1.40 to 1.80.

3. The composition of claim 2 wherein the viscosity is 1.50 to 1.70.

4. The composition of claim 1 wherein the copolyester has a melting point of 100° to 130° C.

* * * * *

UNITED STATES PATENT AND TRADEMARK OFFICE
CERTIFICATE OF CORRECTION

PATENT NO.   :   5,134,221
DATED        :   July 28, 1992
INVENTOR(S)  :   Annette Lavalette It is certified that error appears in the above-identified patent and that said Letters Patent is hereby corrected as shown below:

On the title page:   Foreign Application Priority Data

[30]       "Nov. 12, 1976 [DE] Fed. Rep. of Germany
                                        3738495"

should be

--Nov. 12, 1987 [DE] Fed. Rep. of Germany 3738495--

Signed and Sealed this

Fourteenth Day of January, 1997

Attest:

BRUCE LEHMAN

Attesting Officer          Commissioner of Patents and Trademarks